S. C. SWINDLER.
AUTOMATIC SIGN.
APPLICATION FILED MAR. 22, 1916.

1,313,757.

Patented Aug. 19, 1919.
3 SHEETS—SHEET 1.

Inventor:
Samuel Clyde Swindler.

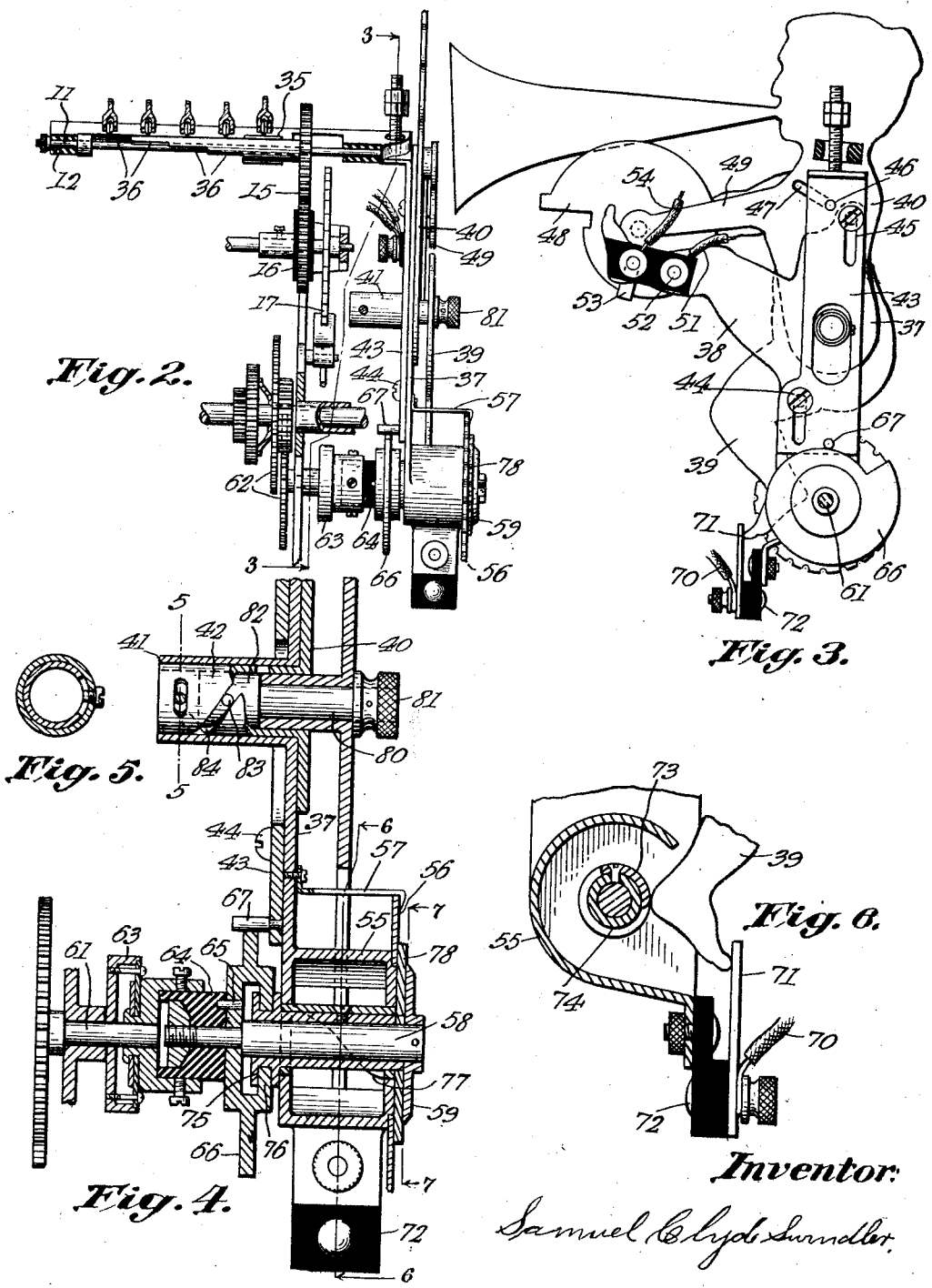

S. C. SWINDLER.
AUTOMATIC SIGN.
APPLICATION FILED MAR. 22, 1916.

1,313,757.

Patented Aug. 19, 1919.
3 SHEETS—SHEET 3.

Inventor:

Samuel Clyde Swindler.

UNITED STATES PATENT OFFICE.

SAMUEL CLYDE SWINDLER, OF PRATT, KANSAS.

AUTOMATIC SIGN.

1,313,757.  Specification of Letters Patent.  Patented Aug. 19, 1919.

Application filed March 22, 1916. Serial No. 86,035.

*To all whom it may concern:*

Be it known that I, SAMUEL CLYDE SWINDLER, a citizen of the United States, residing at Pratt, in the county of Pratt and State of Kansas, have invented certain new and useful Improvements in Automatic Signs, which are operated by an ordinary eight-day clock, of which the following is a specification, reference being had to the accompanying drawing.

This invention has for its object to provide an improved clock controlled mechanism for actuating a plurality of circuit closers connected with signs or other electrically operated devices and for controlling the time and duration of operation of the sign or other device.

Figure 1:
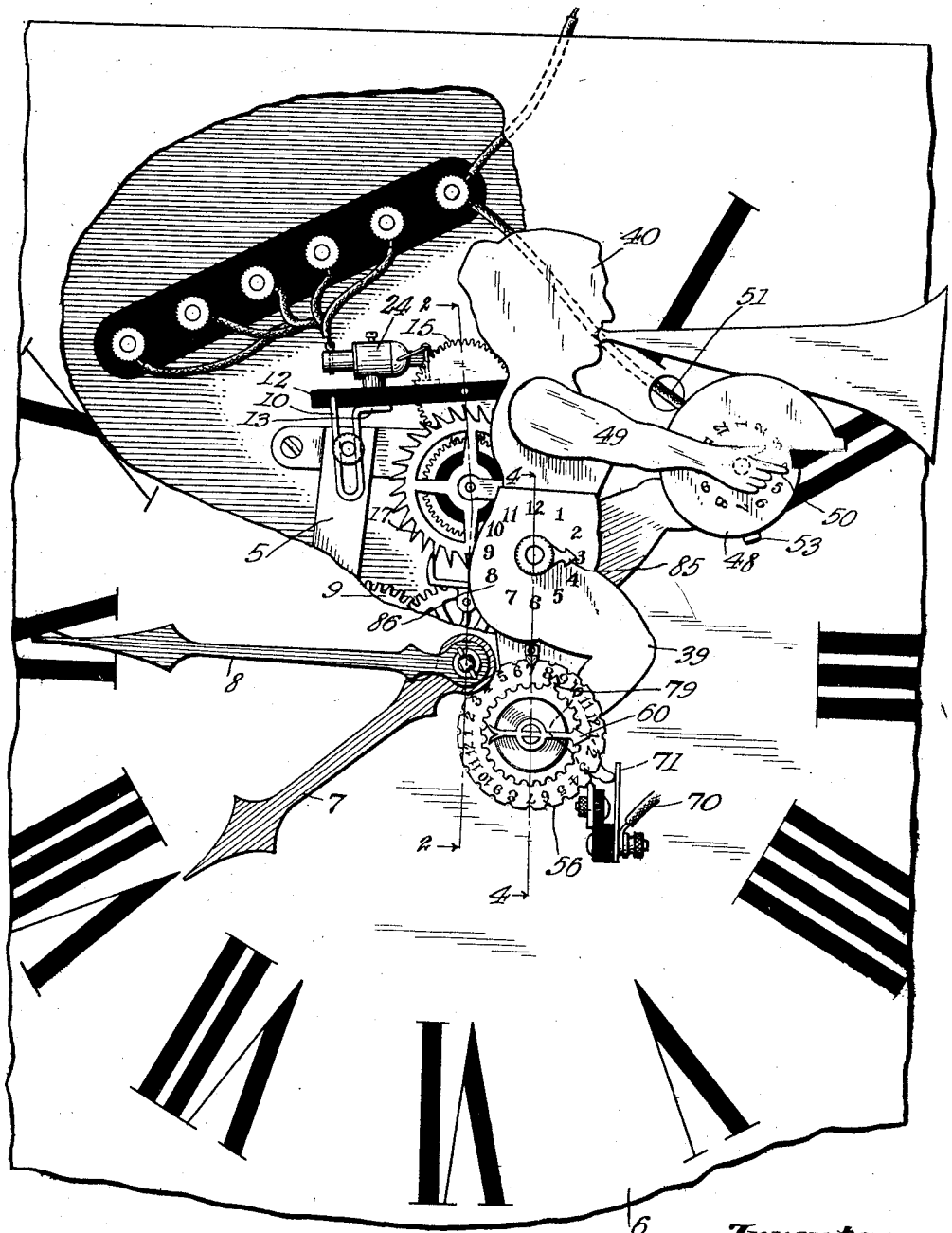
Figure 7:
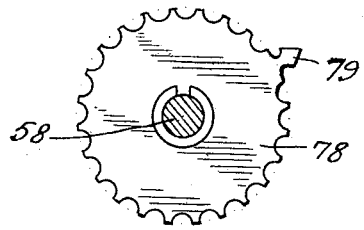
Figure 8:
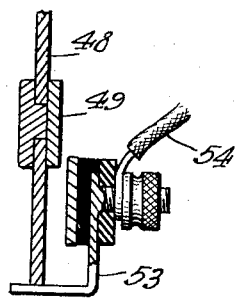
Figure 9:
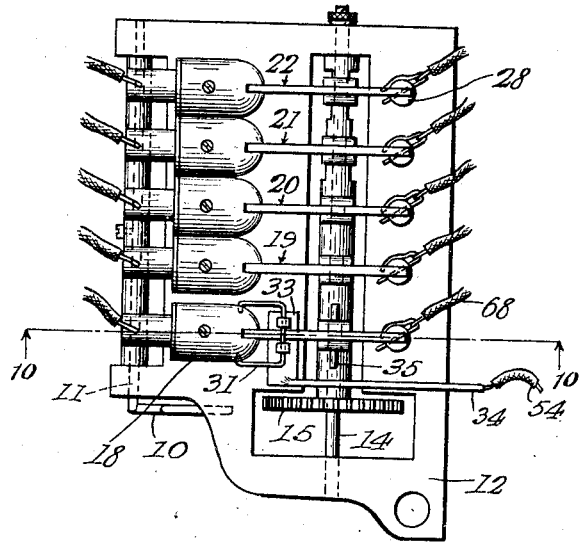
Figure 11:
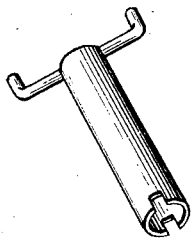
Figure 10:
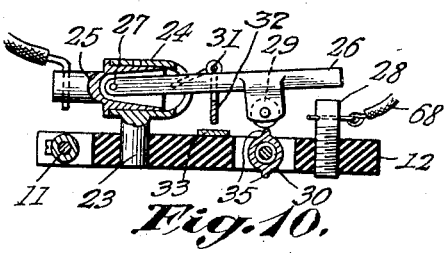

With this and other objects in view, the invention consists in the novel construction, combination and arrangement of parts as will be hereinafter specifically described, claimed and illustrated in the accompanying drawings, in which:

Figure 1 represents a fragmentary front elevation, partly broken away, of the clock, Fig. 2 represents a detail sectional view on the line 2—2 of Fig. 1, Fig. 3 represents a vertical sectional view on the line 3—3 of Fig. 2, Fig. 4 represents a sectional view on the line 4—4 of Fig. 1, Fig. 5 represents a detail sectional view on the line 5—5 of Fig. 4, Fig. 6 represents a sectional view on the line 6—6 of Fig. 4, Fig. 7 represents a sectional view on the line 7—7 of Fig. 4, Fig. 8 represents a detail sectional view through a part of the mechanism, Fig. 9 represents a plan of the insulating plate carrying a series of circuit closers for controlling the letters of an electric sign, Fig. 10 represents a transverse sectional view on the line 10—10 of Fig. 9, and Fig. 11 represents a perspective view of the adjusting key for the clock.

Referring to the drawing in detail, the numeral 5 indicates the frame supporting the clock mechanism including the train of wheels 9, dial 6 and hour and minute hands 7 and 8, respectively.

A bracket arm 10 is suitably secured to the frame 5 and includes a horizontal extension 11 pivotally supporting an insulating plate 12. A stop member 13 is connected with the bracket arm and is designed to limit the downward movement of the plate 12, which latter rotatably supports a shaft 14 carrying a gear wheel 15 adapted, when the plate 12 is lowered, to mesh with a gear wheel 16 connected with the escapement mechanism 17 of the clock, whereby the shaft 14 is rotated.

A series of circuit closers, designated generally by the numerals 18, 19, 20, 21 and 22, are arranged upon the plate 12 and are designed to control the flow of electrical current to the letters of a sign or other electrical device (not shown). Each circuit closer includes a post 23 anchored in the plate or insulator 12 carrying a housing or socket 24 in which is arranged a recessed plug 25. A contact arm 26 is pivotally secured at 27 to the plug 25, and the plug housing and arm 26 are constructed of conducting material. A contact member 28 is arranged under and adapted to be engaged by the free end of each arm 26. A contact roller 29 is rotatably supported in depending ears carried by each arm 27, and the several rollers are supported upon a cam sleeve 30.

A substantially U-shaped member 31 is pivotally secured to the housing or socket 24 of the front circuit closer 18 and straddles the arm 26. A contact plate 32 is pivotally supported by the member 31, and is adapted, when the front arm 26 is in its lowermost position, to engage a plate 33 fastened to the insulating plate 12 and thereby establish an electrical connection between an arm 34 carried by the plate 33 and the front arm 26.

The cam sleeve 30 is non-rotatably secured upon the shaft 14 and the front end thereof is provided with opposed cams or projections 35 for engaging the roller 29 of the front arm 26 and elevating the latter to break the electrical connection between the arm 26 and the plate 33 and the arm 26 and the contact member 28. Portions of the sleeve 30 underlying the arms 26 of the several circuit closers 19, 20, 21 and 22 are cut away to present a series of cams 36 which decrease in width toward the rear end of the sleeve so as to allow the arms 26 of the several circuit closers to successively drop by gravity against the contact members 28. The sleeve 30 and rollers 29 are constructed of conducting material so as to electrically connect the arm 26 of the front circuit closer 18 with the arms of the several other circuit closers.

A figure including a base plate 37, carrying a relatively stationary leg 38, a pivoted leg 39 and a pivoted body 40, is arranged in front of the dial 6. The base plate 37 is provided with a tubular extension 41 in which a tubular extension 42 of the pivoted body 40 is pivotally mounted. A vertically movable plate 43 is arranged behind the base plate 37 and is guided in its vertical movement by guide screws 44 secured to the base plate and working in slots 45 formed in the plate 43. A forwardly projecting pin 46 is formed upon the plate 43 and is received in an inclined slot 47 formed in the pivoted body 40, whereby the latter is swung forwardly and backwardly during vertical movement of the plate 43. The insulating plate 12 rests upon the upper angular terminal of the plate 43 and is adapted to be elevated by the latter to move the gear wheel 15 out of mesh with the wheel 16.

A spiral cam 48 is rotatably mounted between the arms 49 carried by the body 40 and the front face thereof is provided with numerals movable under an indicating finger 50 carried by the front arm 49 permitting the operator to regulate the duration of operation of the sign or other electrical device controlled by the several circuit closers 18, 19, 20, 21 and 22 by differently adjusting the projection of cam 48 with regard to hook shaped contacts 53.

One feed wire 51 of the electrical circuit is connected with a binding post 52, which is grounded in the leg 38. The cam 48, which is connected with the grounded side of the circuit, is adapted to engage a relatively stationary contact member 53 secured to and insulated from the leg 38 and the member 53 is electrically connected with the arm 34 of the contact plate 33 by a conductor 54, and thus when the pivoted body 40 is swung forwardly by a downward movement of the plate 43 an electrical connection is established between the grounded feed wire 51 and the contact plate 33.

The lower terminal of the base plate 37 is provided with a housing 55 upon which a suitably marked ring 56 is rotatably mounted and the ring is provided with peripheral recesses adapted to receive a spring indicating finger 57 attached to the plate 37. A rotatable shaft 58 is mounted in the housing 55 and is connected at its front end with a disk 59 carrying a finger or pointer 60 movable over the numerals on the ring 56.

A shaft 61 is suitably supported in the frame 5 and is connected by gear wheels 62 with the hour hand shaft of the clock mechanism and the front end of the shaft 61 is connected by a coupling 63 with an insulator 64 secured to the rear terminal of the shaft 58. The coupling 63 provides a yieldable connection permitting the shaft 58 to be turned independently of the shaft 61 for adjusting and time setting purposes for instance, but providing sufficient resistance to the independent movement of the shafts to transmit the rotary movement of the shaft 61, imparted to the latter by the clock mechanism, to the shaft 58. The insulator 64 is connected with a spiral cam 66 by a pin 65, whereby the cam and shaft 58 are non-rotatably connected.

The lower portion of the plate 43 is connected with a pin 67 which rests upon the cam 66 and thus as the cam rotates, during operation of the clock mechanism, the plate 43 is elevated. As the most prominent portion of the cam 66 passes under the pin 67, the latter, together with the plate 43, drops and the pin 46, working in the slot 47, effects a forward movement of the body 40, engaging the cam 48 with the contact member 53 and establishing an electrical connection between the grounded feed wire 51 and the plate 33. The insulator plate 12 drops with the plate 43 moving the gear wheel 15 into mesh with the wheel 16 and setting the shaft 14 and sleeve 30 in operation. As the roller 29 of the front circuit closer 18 moves over the portion of the sleeve 30 between the projections 35, the contact member 32 engages the plate 33 and the electrical current passes through the arm 26 of the front circuit closer 18 into the contact member 28 associated therewith. Wires 68 are connected with the contact members 28 for conducting the current to the letters of the sign or other electrically operated device (not shown). During the rotary movement of the cam sleeve 30, the arms 26 successively drop upon their contact members 28 and the current is distributed through the several wires 68. When the arm 26 of the front circuit closer 18 is elevated by one of the projections 35 the contact member 32 is disengaged from the plate 33 and the electrical connection between the several circuit closers and the plate 33 is broken.

For controlling another set of lamps, or other electrically operated devices, the pivoted leg 39, which is electrically connected with the feed wire 51 is adapted to engage a relatively stationary plate 71, carried by an insulator 72 and connected with a wire 70. The plate 71 extends upwardly from the insulator 72 and is arranged in the path of and adapted to be engaged by the toe of the foot 39. The leg 39 is normally held by gravity in spaced relation to the plate 71 and is moved into engagement with the plate by a cam plate 73 secured upon a sleeve 74, which latter is rotatably mounted upon the shaft 58. The rear terminal of the sleeve 74 is provided with spaced flanges 75 frictionally engaging a flange 76 carried by the spiral cam 66, so that the sleeve and cam plate 73 are rotated by the clock mechanism, as will be understood. The front edge of the cam plate 73, with relation to the direction of travel thereof, is spiral shaped, as indicated at 77, for engaging the heel of the leg 39 and swinging the latter into engagement with the plate 71. The front end of the sleeve 74 is connected with a disk 78, which is arranged between the pointer 59 and the housing 55, and is provided with a pointer 79 movable over the figures on the ring 56, whereby the cam plate 73 may be adjusted to cause the leg 39 to be moved against the plate 71 at a predetermined time.

The leg 39 is pivotally supported upon a shaft 80 journaled in the tubular extension 42 of the body 40, and is confined between collars or flanges 81 and 82 formed upon or secured to the front and rear terminals, respectively, of the shaft. The rear collar 82 is provided with a laterally projecting pin 83, which is received within a spiral slot 84 formed in the tubular extension 42 of the base plate 37, whereby when the shaft 80 is rotated in the proper direction, it is moved forwardly by engagement of the pin 83 in the slot to move the leg forwardly and engage the toe portion thereof with the relatively thick portion of the cam plate 73 in order to regulate the duration of the operation of the electrical device controlled by the contact of the toe of the leg 39 with the contact plate 71. The front collar 81 is provided with a pointer 85, movable over figures 36 formed or marked upon the pivoted leg 39.

I claim:—

1. A device of the character set forth including an electric conductor, a distributing switch electrically connected to said conductor and adapted when operated to successively open and close a plurality of electric circuits, a second switch in said conductor, and means adapted to open and close said second switch and to operate said distributing switch only during the time said second switch is closed.

2. A device of the character set forth including an electric conductor, a movably mounted distributing switch electrically connected to said conductor and adapted when operated to open and close a plurality of electric circuits, a second switch in said conductor, a motor, and means operated by the motor for closing said second switch and at the same time moving the distributing switch into position to be operated by said motor during the time said second switch is closed, said means being adapted to open the second switch and at the same time move the distributing switch out of operative position with relation to the motor.

3. In a device of the character stated, a motor, a distributing switch movable into and out of operative engagement with said motor, a control switch interposed in the circuit of said distributing switch, and adjustable means operated by the motor for moving said distributing switch into and out of operative engagement with said motor, said control switch being adjustable so as to insure closing and opening of the main circuit of the distributing switch simultaneously with movement of said distributing switch into and out of operative engagement with the motor.

4. In a device of the character stated, a motor, a distributing switch, a driven member operatively connected thereto and movable into and out of operative engagement with said motor, and means for moving said member into and out of engagement with the motor and for simultaneously closing and opening the main circuit of said distributing switch.

5. In a device of the character stated, a motor, a gear driven thereby, a distributing switch, a gear operatively connected to said switch and movable into and out of mesh with the gear driven by the motor, and means for moving the distributing switch gear into and out of mesh with the motor gear and for simultaneously closing and opening the main circuit of said distributing switch.

6. In a device of the character stated, a motor, a distributing switch including a rotary circuit control member, a gear connected to said member for rotating the same, a gear driven by the motor, the switch gear being movable into and out of mesh with the motor driven gear, and means for moving said switch gear into and out of mesh with motor driven gear and for simultaneously closing and opening the main circuit of said distributing switch.

7. In a device of the character stated, a motor, a movable switch supporting frame, a distributing switch carried thereby, an operating gear carried by said switch, a gear driven by said motor, and means for moving said switch supporting frame so as to move the switch operating gear into and out of mesh with said motor driven gear and for simultaneously closing and opening the main circuit of said distributing switch.

8. In a device of the character stated, a motor, a distributing switch movable into and out of operative engagement with said motor, a slidable member connected to said switch for moving the same, operating connections between said member and the motor, and means operated by said motor for opening and closing the main circuit of said distributing switch simultaneously with movement of the distributing switch into and out of operative engagement with the motor.

9. In a device of the character stated, a motor, a distributing switch movable into and out of operative engagement with said motor, a slidable member connected to said switch for moving the same into and out of operative engagement with the motor, adjustable operating connections between said member and the motor, and means operated by said motor for opening and closing the main circuit of the distributing switch, said means being adapted to be adjusted correspondingly to the adjustment of the connections between said slidable member and the motor so as to insure opening and closing of the main circuit of the distributing switch simultaneously with movement of said switch into and out of operative engagement with said motor.

10. In a device of the character stated, a motor, a movable switch supporting frame, a distributing switch carried thereby, an operating gear carried by said distributing switch, a gear driven by said motor, a slidable member connected to said frame for shifting the same so as to move the distributing switch operating gear into and out of mesh with said motor driven gear, adjustable operating connections between said slidable member and motor, and means operated by the motor for closing and opening the main circuit of the distributing switch simultaneously with movement of the distributing switch operating gear into and out of mesh with said motor driven gear.

11. In a device of the character stated, a motor, a vertically movable switch supporting frame, a gear driven by said motor, an operating gear carried by said distributing switch and movable into and out of mesh with said motor driven gear by shifting of the distributing switch supporting frame, a slidable member connected to said supporting frame for raising the same, a cam member rotated by said motor and connected to said slidable member for raising the same and for holding said member raised for predetermined periods of time, and means operated by the motor for closing and opening the main circuit of the distributing switch simultaneously with lowering and raising of the distributing switch operating gear into and out of mesh with said motor driven gear.

12. In a device of the character stated, a motor, a vertically movable switch supporting frame, a gear driven by said motor, an operating gear carried by the distributing switch and movable into and out of mesh with said motor driven gear by shifting of the switch supporting frame, a vertically slidable member connected to said frame for raising the same, a cam member rotated by said motor and connected to said slidable member for raising the same and for holding the slidable member raised for predetermined periods of time, said cam member being capable of independent rotary adjustment, and means operated by the motor for closing and opening the main circuit of the distributing switch simultaneously with lowering and raising of the distributing switch operating gear into and out of mesh with said motor driven gear.

13. In a device of the character stated, a motor, a vertically movable switch supporting frame, a gear driven by said motor, an operating gear carried by the distributing switch and movable into and out of mesh with said motor driven gear by shifting of the switch supporting frame, a vertically slidable member connected to said frame for raising the same, a cam member rotated by said motor and connected to said slidable member for raising the same and for holding the slidable member raised for predetermined periods of time, said cam member being capable of independent rotary adjustment, a switch element interposed in the main circuit of said distributing switch, a rotatably adjustable cam member interposed in the said main circuit for contact with said switch element, and means operated by the motor for moving said cam member into and out of contact with said switch element simultaneously with lowering and raising of said slidable member for shifting the switch supporting frame.

SAMUEL CLYDE SWINDLER.

Witnesses:
RAY PARKER,
EARL D. LAMBERT.

Copies of this patent may be obtained for five cents each, by addressing the "Commissioner of Patents, Washington, D. C."